United States Patent [19]

Tono et al.

[11] Patent Number: 5,167,990
[45] Date of Patent: * Dec. 1, 1992

[54] METHOD FOR TREATING THE SURFACE OF A PHOSPHOR

[75] Inventors: Hideo Tono; Tomohiro Miyazaki, both of Odawara, Japan

[73] Assignee: Kasei Optonix, Ltd., Tokyo, Japan

[*] Notice: The portion of the term of this patent subsequent to Jun. 30, 2009 has been disclaimed.

[21] Appl. No.: 784,708

[22] Filed: Oct. 30, 1991

Related U.S. Application Data

[62] Division of Ser. No. 446,669, Dec. 6, 1989.

[30] Foreign Application Priority Data

Dec. 8, 1988 [JP] Japan ................................ 63-310648

[51] Int. Cl.$^5$ ............................................. C09K 11/54
[52] U.S. Cl. .............................. 427/215; 252/301.6 R; 427/64; 427/68
[58] Field of Search ..................... 252/301.6; 428/403; 427/64, 68, 215

[56] References Cited

U.S. PATENT DOCUMENTS

| | | | |
|---|---|---|---|
| 2,921,201 | 1/1960 | Lieb | 252/301.6 R |
| 4,275,333 | 6/1981 | Kagami et al. | 252/301.6 R |
| 4,287,257 | 9/1981 | Ohmatoi et al. | 427/68 |

FOREIGN PATENT DOCUMENTS

| | | |
|---|---|---|
| 0353653 | 2/1990 | European Pat. Off. |
| 2034910 | 6/1980 | United Kingdom |

*Primary Examiner*—Jack Cooper
*Attorney, Agent, or Firm*—Oblon, Spivak, McClelland, Maier & Neustadt

[57] ABSTRACT

A phosphor comprising a phosphor and zinc oxide formed in a suspension of the phosphor and attached to the surface of the phosphor.

3 Claims, 7 Drawing Sheets

METHOD FOR TREATING THE SURFACE OF A PHOSPHOR

This is a division of application Ser. No. 446,669, filed on Dec. 6, 1989.

The present invention relates to phosphors for cathode ray tubes and a method for treating the surface thereof. More particularly, it relates to phosphors capable of forming excellent phosphor screens on face plates, and a method for treating the surface thereof.

As is well known, phosphor screens for color television cathode ray (picture) tubes are composed of blue, green, and red emitting phosphor dots or stripes of blue, green, and red emitting phosphor components disposed regularly on a face plate. The phosphor screens for color television picture tubes are prepared by a photo-printing method. That is, a first light emitting phosphor component is dispersed in a solution of a light sensitive resin such as, for example, an aqueous solution of polyvinyl alcohol activated with a dichromate, to provide a phosphor slurry. The phosphor slurry obtained is applied over the whole surface of a face plate by an appropriate coating method such as by rotary coating, etc. (slurry coating), and then the coated layer is irradiated by energy rays such as ultraviolet rays, etc., in conformity with a desired pattern, whereby the resin is hardened and insolubilized at the portions irradiated by the energy rays (light exposure). Thereafter, the resin at the non-irradiated portions (unhardened resin portions) is dissolved away by a solvent, etc. (development) to form dots or stripes composed of the first light emitting phosphor component. Then, by successively repeating slurry coating, exposure and development in the same manner as described above using second and third light emitting phosphor components, dots or stripes composed of the second and third light emitting phosphor components are formed on the face plate. In this case, as matter of course, the energy ray irradiation must be so controlled that the dots or stripes composed of each of the first, second, and third light emitting phosphor components are repeatedly and regularly disposed on the face plate without being overlapped with each other. Then, the fluorescent screen containing the resin component thus prepared is fired at a proper temperature to decompose and volatilize the resin component, whereby a desired phosphor screen is obtained.

For making phosphor screens for color television picture tubes by a photo-printing method using the above-mentioned phosphor slurries, the following requirements must be met.

1. The phosphor screen must be dense and have few pin holes or the like;
2. One light emitting phosphor component must not intermix with other light emitting component phosphors, i.e. color mixing must not occur;
3. The phosphor slurry must have high light exposure sensitivity and must be easy to work with;
4. Formation of the light emitting elements (dots or stripes) must be excellent, i.e. the edges must be sharp, the dots must be circular, and the stripes must be linear;
5. The exposed phosphor screen must not fall off the face plate by high pressure aqueous development treatment during the development process, i.e. it must have a high adhesive strength.

Heretofore, various studies and improvements have been made with respect to the surface treatment of phosphors, the compositions and the method for the preparation of phosphor slurries with an aim to satisfy the above requirements. For example, Japanese Examined Patent Publication No. 21675/1985 discloses a phosphor having its surface coated with zinc hydroxide for the purpose of improving items 2 and 3 among the above requirements.

With respect to the color television picture tubes, there has been an increasing demand for improving the image quality in recent years. For this purpose, it is necessary to form finer picture elements on a face plate so that a highly fine image can be formed.

To fulfill the above demand, it is firstly required to satisfy the requirement that the adhesive strength of the screen portion hardened by the exposure is high (above requirement 5) and the requirement that color mixing must not occur (above requirement 2), simultaneously. However, in order to increase the adhesive strength of phosphor screens by conventional methods for forming phosphor screens, a method is usually employed wherein the drying is strengthened at the time of coating, whereby there will be a difficulty such that the higher the adhesive strength of the phosphor screen, the more the unnecessary phosphors tend to remain on other positions thus leading to color mixing. With the above-mentioned phosphor coated with zinc hydroxide, it is hardly possible to satisfy such mutually opposing requirements at the same time. It is conceivable to increase the amount of zinc hydroxide coated in order to adequately prevent color mixing in the above-mentioned phosphor coated with zinc hydroxide. However, if the amount of the coated zinc hydroxide increases, the action for aggregation of zinc hydroxide colloid increases in the phosphor slurry, whereby the dispersibility of the phosphor in the slurry deteriorates, which in turn tends to lead to a decrease of the adhesive strength, formation of pin holes or a deterioration in the sharpness of the edge.

The present invention has been made in view of the above problems, and it is an object of the present invention to provide a phosphor which is capable of preventing the occurrence of color mixing of the phosphor screen and increasing the adhesive strength of the phosphor screen at the same time and which is excellent in the dispersibility in the slurry, and a method for treating the surface thereof.

The present inventors have conducted extensive researches to accomplish the above object and as a result, have found that among phosphors having zinc oxide attached in their surface, those obtained by forming and attaching zinc oxide on the phosphor surface in a suspension of a phosphor, have the above-mentioned desired properties for forming phosphor screens.

Namely, the phosphor of the present invention comprises a phosphor and zinc oxide formed in a suspension of the phosphor and attached to the surface of the phosphor. Here, "zinc oxide is formed in a suspension" means that zinc oxide is formed by reacting zinc ions and an alkaline solution in the suspension.

Now, the present invention will be described in detailed with reference to the preferred embodiments.

In the companying drawings:

FIGS. 4(a), (b) and (c) are diagrammatical views of the above-mentioned phosphor particle having zinc oxide attached on its surface, the phosphor particle having zinc oxide deposited on its surface and the phosphor particle having zinc hydroxide attached on its surface.

Figure 1A:
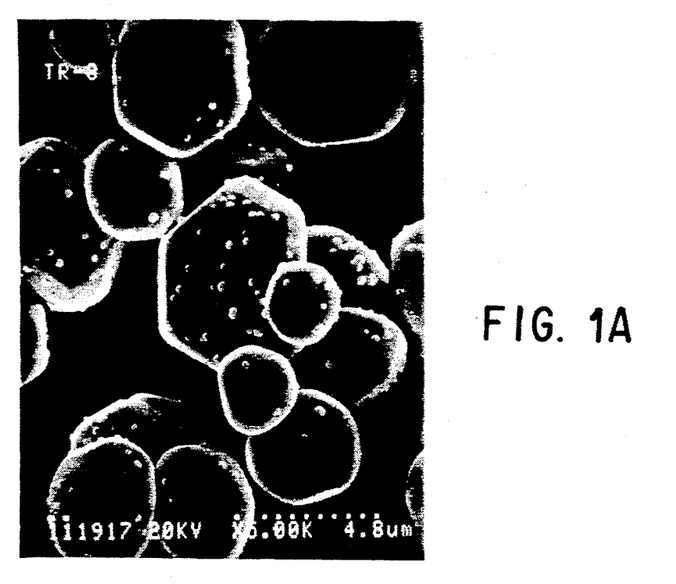
FIGS. 1(a) and (b) are microscopic enlarged photographs of phosphor particles having zinc oxide formed in a suspension attached on their surface.
Figure 1B:
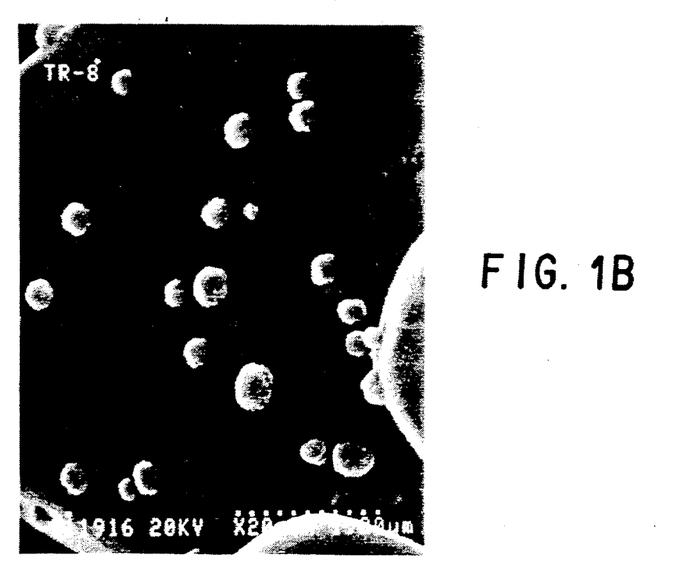
Figure 2A:
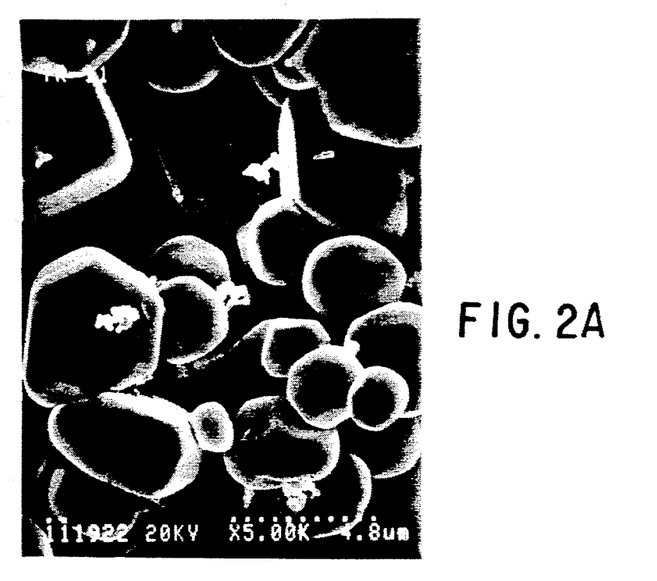
FIGS. 2(a) and (b) are microscopic enlarged photographs of phosphor particles having zinc oxide attached merely by mixing phosphor and ready made zinc oxide on their surface.
Figure 2B:
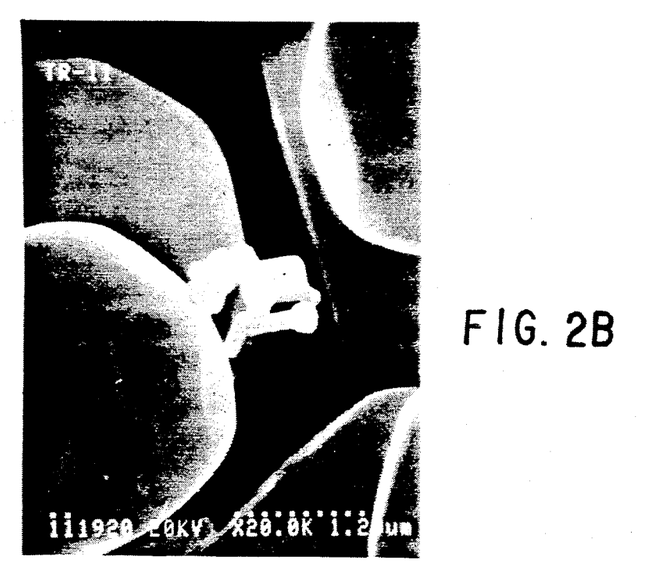
Figure 3A:
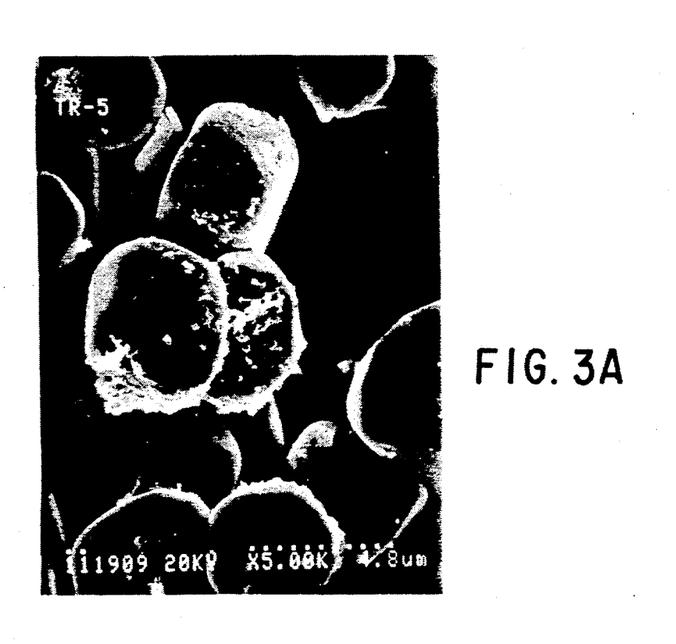
FIGS. 3(a) and (b) are microscopic enlarged photographs of phosphor particles having zinc hydroxide attached on their surface.
Figure 3B:
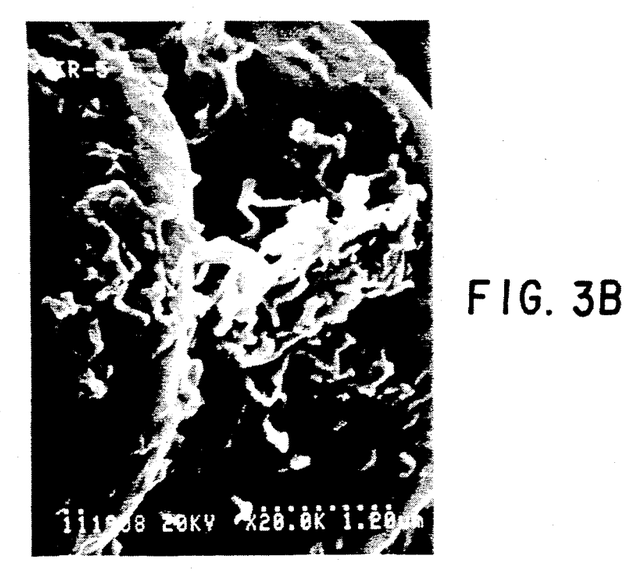
Figure 4:
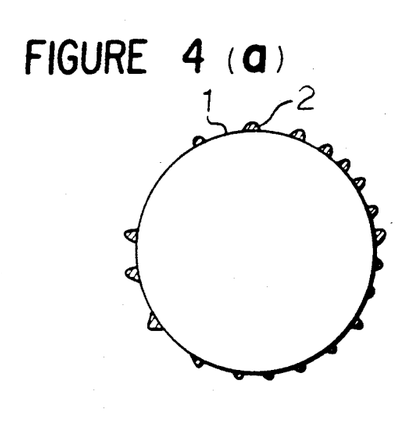

FIGS. 1(a) and (b) show photographs of the phosphor of the present invention enlarged 5,000 and 20,000 magnifications, respectively, by an electron microscope. FIGS. 2(a) and (b) show, for the purpose of comparison with the phosphor of the present invention, electroscopic photographs with 5,000 and 20,000 magnifications, respectively, of a phosphor having zinc oxide deposited on its surface by adding a dispersion of commercially available zinc oxide to a suspension of the phosphor, followed by stirring and mixing. Further, FIGS. 3(a) and (b) are electron microscopic photographs with 5,000 and 20,000 magnifications, respectively, of a phosphor having zinc hydroxide formed in a suspension of the phosphor attached on its surface. FIGS. 4(a), (b) and (c) are diagrammatical views of a phosphor 1 corresponding to the phosphor of FIG. 1 and having zinc oxide 2' attached on its surface, a phosphor 1 corresponding to the phosphor of FIG. 2 and having zinc oxide 2' deposited on its surface, and a phosphor 1 corresponding to the phosphor of FIG. 3 and having zinc hydroxide 3 attached on its surface. These phosphors were taken out from the respective suspensions by filtration, followed by dehydration and drying.

It is evident from the above Figures that the phosphor of the present invention has zinc oxide consistently firmly attached thereto as compared with the phosphor having zinc oxide particles directly deposited. Further, zinc oxide attached to the phosphor of the present invention is different in the shape of attachment from the conventional zinc hydroxide and is attached to the phosphor surface in a relatively uniformly distributed state.

The phosphor of the present invention may be the one having zinc oxide formed as described above and an assistant for stabilizing the attachment of zinc oxide colloidal substance attached on its surface. The assistant for stabilizing the attachment may be, for example, zinc hydroxide, aluminum hydroxide, alumina sol, zinc phosphate, magnesium phosphate, aluminum phosphate, barium phosphate, calcium phosphate, zinc pyrophosphate, calcium pyrophosphate, magnesium pyrophosphate, aluminum pyrophosphate, colloidal silica, ionic silica (water glass) or powdery silica. Such an assistant for stabilizing the attachment may be incorporated to a phosphor suspension prior to incorporation of zinc ions to the suspension so that it may preliminarily deposited on the phosphor surface, or it may be deposited onto the phosphor surface to which zinc oxide has already been attached.

Figure 5:
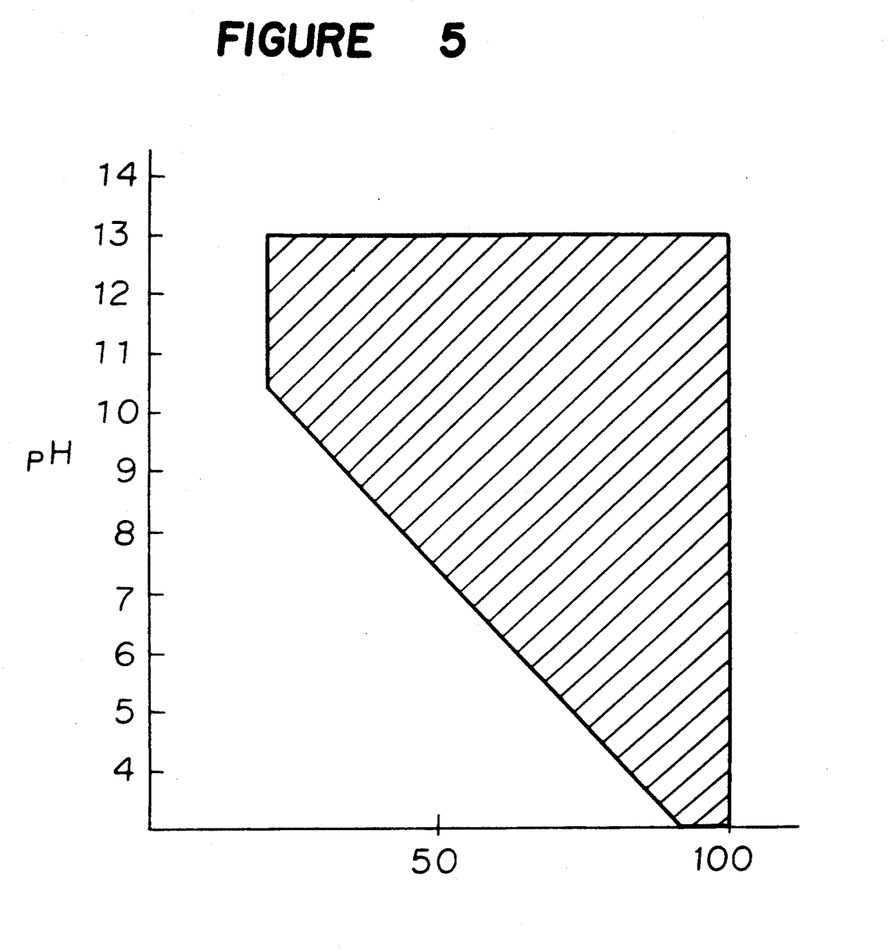
FIG. 5 is a graph showing the temperature and pH ranges in which zinc oxide is formed.

A method for treating the surface of a phosphor to prepare the phosphor of the present invention comprises maintaining a phosphor suspension containing a phosphor and zinc ions at a predetermined temperature, and adding an alkaline solution to the suspension to adjust the pH to a predetermined level, so that zinc oxide colloidal substance is formed in the suspension, and zinc oxide is attached to the surface of the phosphor. Formation of the zinc oxide colloidal substance depends on the temperature and the pH of the suspension. Therefore, maintaining the suspension at a predetermined temperature and adjusting the pH to a predetermined level, means that the temperature and the pH of the suspension are maintained under the conditions where zinc oxide colloidal substance is formed. In general, the higher the temperature and the higher the pH, the more readily zinc oxide tends to form. The specific temperature and pH ranges vary depending upon the type of the zinc ions solution to be added to the phosphor suspension (i.e. the condition under which zinc oxide starts to form, varies depending upon the type of the anion in the solution i.e. whether it is $NO_3^-$, $SO_4^{2-}$, $Cl^-$, $CH_3COO^-$. However, the temperature and the pH at which zinc oxide may be formed by a zinc ion solution by the method of the present invention, are within the range shown by the hatched line portion in FIG. 5. This range is a higher temperature and higher pH range as compared with the above-mentioned case for forming zinc hydroxide. When a zinc nitrate solution is used as the zinc ion solution, the range in which zinc oxide is formed will be close to the oblique boundary straight line in FIG. 5. Whereas, when a zinc sulfate solution is used as the zinc ion solution, the range in which zinc oxide can be formed will be only at a relatively high temperature and high pH portion within the hatched line range in FIG. 5. With each zinc ion solution, zinc hydroxide will be formed at a low temperature and low pH range continuous from the zinc oxide forming range. Namely, in the case of using a zinc nitrate solution, a basic zinc nitrate $[Zn(NO_3)_x \cdot (OH)_y]$ will be formed, and in the case of using a zinc sulfate solution, a basic zinc sulfate $[Zn(SO_u)X \cdot OH_y]$ will be formed. It is possible to form zinc oxide by shifting the temperature and the pH of the suspension to the zinc oxide forming range even after formation of such zinc hydroxide (hereinafter referred to as $Zn(OH)_2$). In a highly alkaline range of pH 13 or higher, zinc hydroxide and zinc oxide will be dissolved again to form $ZnO_2^{2-}$ ions.

Now, Examples of the present invention will be described.

The phosphor of the present invention can be prepared by a method as described below.

Firstly, as an example, a phosphor is put in deionized water of about 70° C. and thoroughly suspended. Then, to this suspension, a solution of e.g. zinc nitrate $[Zn(NO_3)_2]$, zinc acetate $[Zn(CH_3COO)_2]$, zinc halide ($ZnX_2$ wherein X is a halogen other than fluorine), such as zinc chloride ($ZnCl_2$) or zinc sulfate ($ZnSO_4$) containing zinc ions, is added in a suitable amount, and the mixture is again suspended. Among the above zinc ion solutions, a solution of zinc nitrate or zinc acetate is preferred since it is thereby possible to form zinc oxide at a relatively low pH and low temperature range as described hereinafter. Then, an alkaline solution is added to this suspension. At that time, the temperature of the suspension is controlled to be a temperature within the zinc oxide forming range depending upon the pH value adjusted by an alkaline solution. For the alkaline solution, sodium hydroxide (NaOH), potassium hydroxide (KOH) or ammonium hydroxide (NH₄OH) may be employed. When the pH of the phosphor suspension exceeds a certain level by the addition of this alkaline solution, zinc oxide ZnO will be precipitated. Precipitated fine particles of ZnO will be attached on the surface of the phosphor. Then, the suspension is left to stand to let the phosphor having fine particles of ZnO attached thereto sediment. Then, the supernatant is removed by decantation. The remaining ions are removed by repeating washing with deionized water a few times, followed by dehydration and drying at a temperature of from 100° to 150° C. After drying, a bulky phosphor obtained is disintegrated by passing through a screen to obtain the desired phosphor.

The substance attached on the phosphor by the above described operation, was forcibly peeled off by supersonic treatment, separated from the phosphor by sedimentation and then analyzed by X-rays, whereby it was confirmed that from the initial state of attachment to the phosphor surface, the attached substance was ZnO irrespective of the temperature for drying treatment. The phosphor for color television picture tubes to be used in the present invention, includes all kinds of phosphors useful as the blue, green or red emitting component phosphor for a color television picture tube phosphor screen. This phosphor for color television picture tubes, may be a single phosphor, or a phosphor mixture such as a green emitting component phosphor composed of a mixture of a copper and aluminum-activated zinc sulfide phosphor (ZnS:Cu,Al) and a gold and aluminum-activated zinc sulfide phosphor (ZnS:Au,Al), which has been practically used recently. Further, recently a so-called pigment-attached phosphor which is a phosphor having its surface coated with pigment particles is used for a phosphor screen of a high contrast color television picture tube. The phosphor for color television picture tubes to be used in the present invention may also be-such a pigment-attached phosphor.

Particularly preferred phosphors for color television from a practical viewpoint are as follows: as blue emitting phosphors, there can be mentioned a silver activated zinc sulfide phosphor (ZnS:Ag), a silver and aluminum activated zinc sulfide phosphor (ZnS:Ag,Al), a cobalt aluminate blue pigment particle attached ZnS:Ag phosphor, a cobalt aluminate blue pigment particle attached ZnS:Ag,Al phosphor, etc.; as green emitting phosphors, there can be mentioned mixed phosphors of a ZnS:Cu,Al phosphor and a ZnS:Au,Al phosphor, a ZnS:Cu,Al phosphor, a gold, copper and aluminum activated zinc sulfide phosphor (ZnS:Au,Cu,Al), a copper and aluminum activated zinc-cadmium sulfide phosphor (Zn,Cd)S:Cu,Al)], etc.: and as red emitting phosphors, there can be mentioned a europium activated yttrium oxisulfide phosphor ($Y_2O_2S$:Eu), a europium activated yttrium oxide phosphor ($Y_2O_3$:Eu), a red oxide red pigment particle attached $Y_2O_3S$:Eu phosphor, a red oxide red pigment particle attached $Y_2O_3$:Eu phosphor, a cadmium sulfoselenide red pigment particle attached $Y_2O_2S$:Eu phosphor, a cadmium sulfoselenide red pigment particle attached $Y_2O_3$:Eu phosphor, etc.

Now, the color mixing preventing effects of the phosphor of the present invention will be described.

Color mixing of light emitting phosphor components occurs when a second light emitting phosphor component or a third light emitting phosphor component is slurry-coated, exposed, and developed to form dots or stripes of the phosphor component, the phosphor component attaches to dots or stripes of another light emitting phosphor component already formed and remains there. Such color mixing is called "cross contamination".

Figure 6:
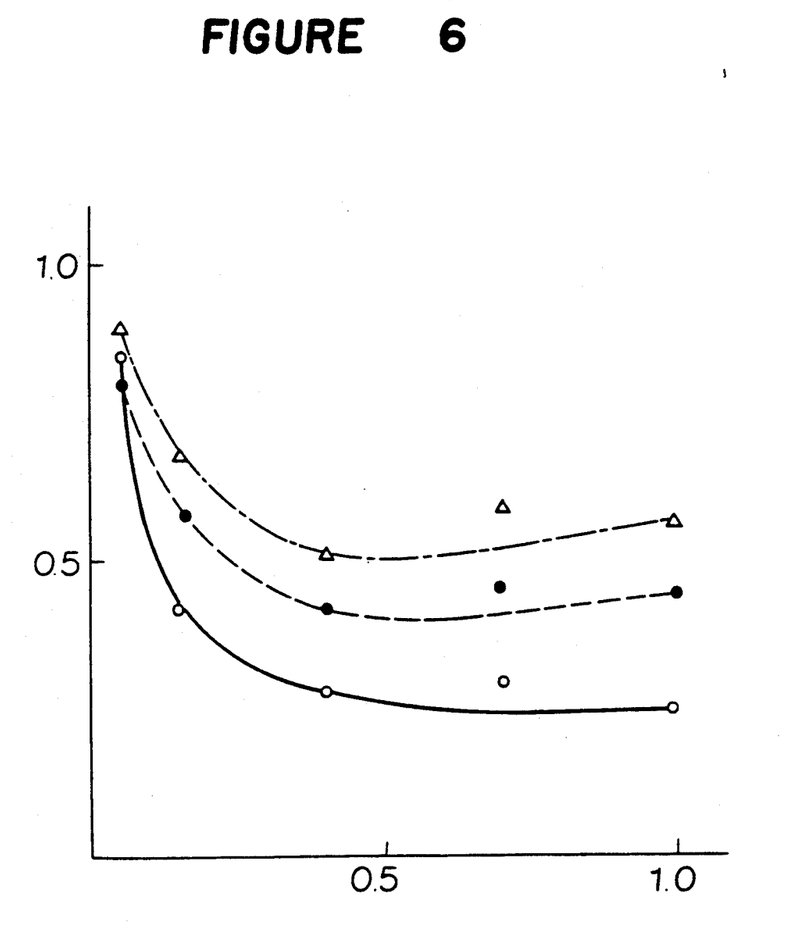
FIGS. 6 and 7 are graphs showing cross-contamination of the phosphor having zinc oxide attached on its surface, the phosphor having zinc oxide deposited on its surface and the phosphor having zinc hydroxide attached on its surface.
Figure 7:
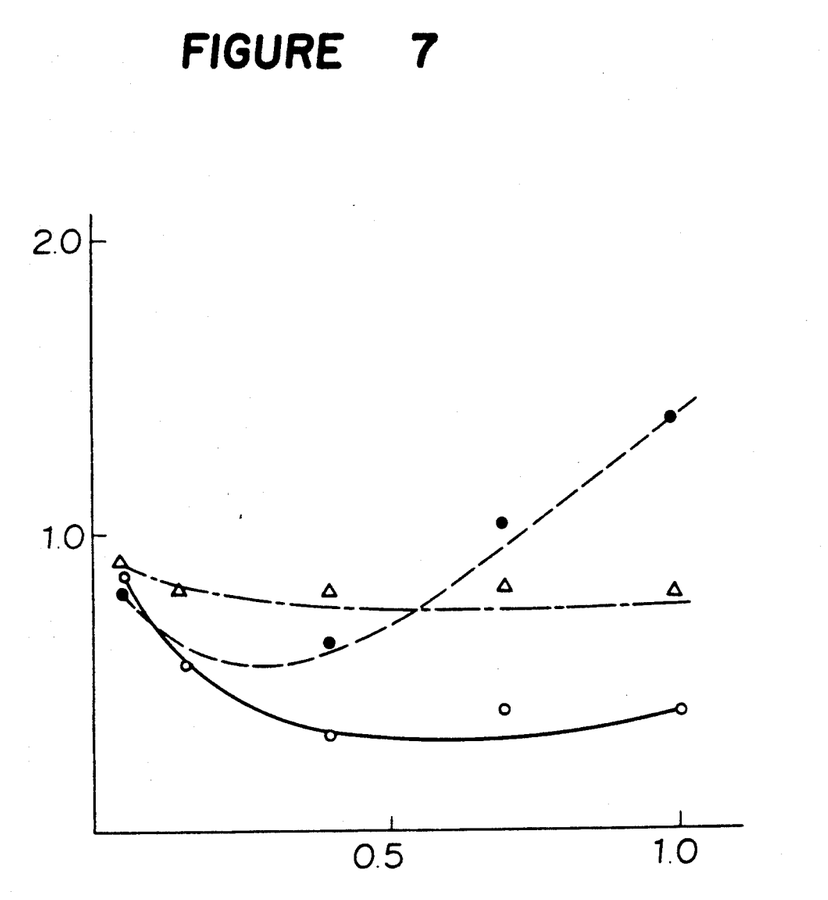

The solid line curves in FIGS. 6 and 7 show the relations between the amount of attached ZnO of a ZnS:Ag phosphor and a $Y_2O_2S$:Eu phosphor having ZnO attached thereto, and the cross contamination of these phosphors with other light emitting phosphor components. Here, the cross contamination means cross contamination to a light emitting phosphor component already coated. FIG. 6 is a graph showing the relation between a post-coated ZnS;Ag phosphor having the amount of the attached ZnO varied and the cross contamination of that phosphor with pre-coated ZnS:Cu,Al green emitting phosphor component. FIG. 7 is a graph showing the relation between a post-coated $Y_2O_2S$:Eu red emitting phosphor component having the amount of the attached ZnO varied and the cross contamination of that phosphor with a pre-coated ZnS:Ag phosphor. In FIGS. 6 and 7, the cross contamination (ordinate) is represented by the values of blue output/green output and red output/blue output, respectively. These values were measured as follows.

In the case of FIG. 6, a slurry of a ZnO-attached ZnS-Ag phosphor sample was coated on a face plate having stripes of a ZnS:Cu,Al green emitting phosphor component (untreated with ZnO) formed beforehand, then dried and developed without performing light exposure. Thereafter (as a matter of course, there was no formation of stripes of a ZnS:Ag phosphor), the stripes of the ZnS:Cu,Al phosphor were excited by ultraviolet ray of 3650 A, the emission thus emitted was divided into two portions by a half mirror, the two lights thus divided were passed through green and blue Wrattern filters respectively, and the output of each light was measured by means of a photomultiplier, whereby the value of blue-output/green-output was determined. The value of blue-output/green-output was determined for each phosphor sample and the values were plotted against the amounts of ZnO (parts by weight per 100 parts by weight of a ZnS:Ag phosphor) of the phosphor samples, taking the value of the phosphor having no ZnO as 1.

In FIG. 6, as Comparative Examples, the alternate long and short dash line shows a case wherein a ZnS:Ag phosphor having ZnO deposited on the phosphor surface by incorporating ZnO particles to the ZnS:Ag suspension, was employed, and the dashed line indicates a case wherein a ZnS:Ag phosphor having Zn(OH)₂ attached thereto instead of ZnO, was employed. With respect to Zn(OH)₂, the weight of Zn(OH)₂ is plotted as calculated as the weight ZnO. Hereinafter, fixing of ZnO or Zn(OH)₂ formed in the suspension to the phosphor surface will be referred to as "attaching", and fixing of ZnO incorporated to the suspension on the phosphor surface will be referred to as "depositing".

In the case of FIG. 7, firstly a ZnS:Ag phosphor sample was slurry-coated, exposed, and developed to form stripes. Then, on the face plate having the stripes of this sample formed, a slurry of a ZnO-attached $Y_2O_2S$:Eu red emitting phosphor component was coated, dried and then developed with warm water without performing light exposure. Thereafter (as a matter of course, there was no formation of stripes of the $Y_2O_2S$:Eu phosphor), the stripes of the phosphor sample were excited by ultraviolet ray of 3650 A, the emission thus emitted was divided into two portions by a half mirror, the two lights thus divided were passed through blue and red Wrattern filters, respectively, and the output of each light was measured by means of a photomultiplier, whereby the value of red-output/green-output was determined. The value of red-output/green-output was determined on each phosphor sample and the values thus obtained were plotted against the amounts of ZnO (parts by weight per 100 parts by weight of the ZnS:Ag phosphor) of the phosphor samples, taking the value of the phosphor having no ZnO as 1.

Also in FIG. 7, as Comparative Examples, the alternate long and short dash line shows a case wherein a $Y_2O_2S$:Eu phosphor having ZnO deposited on the phosphor surface by incorporating ZnO particles to the ZnS:Ag suspension, was employed, and the dashed line shows 9 case wherein a $Y_2O_2S$:Eu phosphor having $Zn(OH)_2$ attached instead of ZnO, was employed. With respect to $Zn(OH)_2$, the weight of $Zn(OH)_2$ was plotted as calculated as the weight of ZnO. In FIGS. 6 and 7, the larger the values of blue-output/green-output and red-output/blue-output, the greater the cross contamination of the ZnS:Ag phosphor to the pre-coated ZnS:Cu,Al phosphor and the cross contamination of the post-coated $Y_2O_2S$:Eu phosphor to the ZnS:Ag phosphor.

As is evident from FIGS. 6 and 7, with the ZnO-attached phosphors of the present invention, the cross contamination can be reduced as compared with the ZnO-deposited phosphors (alternate long and short dash line) and the $Zn(OH)_2$-attached phosphors (dashed line). The effects for reducing the cross contamination are particularly remarkable in the region where the attached amount is greater than the $Zn(OH)_2$ method.

Now, the present invention will be described in further detail with reference to Examples. However, it should be understood that the present invention is by no means restricted by such specific Examples.

EXAMPLE 1

In 3l of deionized water of 70° C., 1,000 g of a ZnS:Ag blue emitting phosphor was put and thoroughly suspended. Then, 60 ml of a 10% zinc nitrate $[Zn(NO_3)_2.6H_2O]$ solution was added thereto, and the mixture was again thoroughly stirred and suspended. Then, while maintaining the temperature of the suspension at 65° C., a 2% NaOH solution was gradually added under stirring to adjust the pH to 8.5. Thereafter, stirring was continued for 30 minutes, and then the mixture was left to stand still for 10 minutes for sedimentation of the phosphor. Then, the supernatant was removed by decantation, and the mixture was washed once with deionized water. Then, the phosphor was collected by filtration, dehydrated, dried at 120° C. for 15 hours and then sieved with a 300 mesh sieve.

The substance attached on the surface of the phosphor thus obtained was peeled off by supersonic treatment, collected and analyzed by X-rays, whereby it was ascertained to be ZnO. The amount of attached ZnO was 0.15 part by weight per 100 parts by weight of the phosphor.

Then, a phosphor slurry was prepared in a usual method by using the phosphor obtained as described above and an ordinary aqueous ammonium bichromate-containing polyvinyl alcohol aqueous solution. A screening test was performed using the phosphor slurry thus obtained, whereby the light sensitivity of the phosphor layer, the adhesiveness to the panel and the color mixing (contamination represented by the blue-output/green-output) were examined. The results are shown in Table 1.

As Comparative Examples, similar tests were performed with respect to a ZnS:Ag phosphor having 0.15% by weight of $Zn(OH)_2$ attached thereto and a ZnS:Ag phosphor having 0.15% by weight of ZnO deposited thereon.

The coating test in this example was conducted in such a manner that a circular filter having the angle and the ultraviolet transmittance varied, was mounted in front of a shadow mask forming stripe picture elements, and a predetermined dose of ultraviolet rays were uniformly irradiated for exposure, followed by development with water, whereupon the state of adhesion of the picture elements (stripes) on the plate was inspected. The adhesion angle in Table 1 is meant for the angle of a fan-shaped portion from the position on the plate of the circular filter where it overlaps with the position where the ultraviolet transmittance is the highest (as a matter of course, the phosphor screen at this position is attached in the most stable state) to the position on the plate where the picture elements start to fall as the ultraviolet transmittance decreases. The larger the angle, the better the sensitivity and the adhesion to the plate. Further, the maximum stripe width is the width of the stripe at the position where the ultraviolet exposure was highest. The larger this width, the higher the sensitivity. The minimum stripe width means the minimum stripe width of the stripe formed in the region where the ultraviolet exposure was reduced by the above circular filter. The smaller this width, the better the adhesiveness. Further, as mentioned above, the cross contamination indicates the degree of color mixing as determined in such a manner that after forming stripes with a green emitting phosphor, a ZnS:Ag blue emitting phosphor is coated and developed without exposure, and then, the ratio in the emission of the green fluorescence to the blue fluorescence under ultraviolet radiation is obtained.

TABLE 1

| Phosphor (ZnS:Ag phosphor) | Screening properties | | | |
|---|---|---|---|---|
| | Amount of ZnO attached (or deposited) | Adhesion angle | Stripe width (maximum) | Stripe width (minimum) | Cross contamination Red output/ blue output |
| ZnO attached | 0.15 wt % | 250° | 220 μm | 130 μm | 0.74 |
| $Zn(OH)_2$ attached | 0.15 wt % | 200° | 200 μm | 150 μm | 1 |
| ZnO deposited | 0.15 wt % | 210° | 210 μm | 135 μm | 1.28 |

It is evident from the above results, the phosphor of the present invention has higher sensitivity and adhesiveness than the conventional phosphor having $Zn(OH)_2$ attached thereto and is less likely to lead to color mixing. It has also been confirmed that in order to obtain such a high quality phosphor, it is not sufficient to merely deposit ZnO on the phosphor surface, but it is necessary to attach ZnO formed in a solution to the phosphor surface.

EXAMPLE 2

In 3l of deionized water of 70° C., 1,000 g of $Y_2O_2S$:Eu red emitting phosphor was put and thoroughly suspended. Then, 120 ml of a 10% zinc nitrate

[Zn(NO$_3$)$_2$.6H$_2$O] solution was added thereto, and the mixture was again thoroughly stirred and suspended. Then, while maintaining the temperature of the suspension at 65° C., a 2.8% NH$_2$OH solution was gradually added under stirring to adjust the pH to 8.5. Thereafter, stirring was continued for 30 minutes, and then the mixture was left to stand still for sedimentation of the phosphor. Then, the surpernatant was removed by decantation, and the mixture was washed once with deionized water. Then, the phosphor was collected by filtration, dehydrated, dried at 120° C. for 15 hours and sieved with a 300 mesh sieve.

The substance attached on the surface of the phosphor thus obtained was peeled off by supersonic treatment, collected and analyzed by X-rays, whereby it was ascertained to be ZnO. The amount of attached ZnO was 0.3 parts by weight relative to 100 parts by weight of the phosphor.

Then, a phosphor slurry was prepared by a usual method by using the phosphor obtained as described above and an ordinary ammonium bichromate-containing polyvinyl alcohol aqueous solution. A screening test was conducted using the phosphor slurry thus obtained, whereby the sensitivity, the adhesion to the panel, the color mixing (cross contamination represented by the red output/blue output) and the powder property (dispersibility) were examined. The results are shown in Table 2. As Comparative Examples, in the same manner as in Example 1, similar tests were conducted also with respect to a Y$_2$O$_2$S:Eu red emitting phosphor having 0.3% by weight of Zn(OH)$_2$ attached thereto and a Y$_2$O$_2$S:Eu red emitting phosphor having 0.3% by weight of ZnO deposited thereon. The sedimentation volume in water in the Table was determined in such a manner that 5 g of the above-mentioned phosphor sample was put in 30 g of an aqueous solution and sedimented after shaking a sedimentation tube for one hour, whereupon the volume was read, and the sedimentation volume in water was represented by the volume per g. The larger the value of the sedimentation volume, the poorer the dispersibility. The water wettability was determined in such a manner that water was added to the phosphor while phosphor was vibrated, and the amount of water required to completely wet the phosphor was taken as the water wettability. The smaller the required amount of water, the more easily the slurry can be prepared. With respect to the hardness of the dried cake, the softer the cake, the better the dispersibility of the phosphor.

Especially with respect to the effect for preventing color mixing, in a case where Zn(OH)$_2$ is attached, the effect tends to deteriorate when the amount of attachment is as much as 0.3% by weight, whereas with the phosphor of the present Example, adequate effects for preventing color mixing have been accomplished even when the amount of attachment of ZnO is relatively large.

EXAMPLE 3

In 3l of deionized water at 70° % C., 1,000 g of a ZnS:Cu,Au,Al green emitting phosphor was put and thoroughly suspended. Then, colloidal silica was added thereto in an amount of 0.5 part by weight relative to 100 parts by weight of the phosphor, and the mixture was thoroughly stirred and dispersed. Then, 60 ml of a 10% zinc nitrate [Zn(NO$_3$)$_2$.6H$_2$O] was added, and the mixture was thoroughly stirred and dispersed. Then, while maintaining the temperature of the suspension at 65° C., a 2% NaOH solution was gradually added under stirring t adjust the pH to 8.5 g. Then, the stirring was continued for 30 minutes, and then the mixture was let to stand still for 10 minutes to let the phosphor sediment. Then, the supernatant was removed by decantation, and the mixture was washed once with deionized water. Then, the phosphor was collected by filtration, dehydrated, dried at 120° C. for 15 hours and sieved with a 300 mesh sieve.

The substance attached to the surface of the phosphor thus obtained, was peeled off by supersonic treatment, collected and analyzed by X-rays, whereupon the substance was ascertained to be composed of SiO$_2$ and ZnO. Further, the amount of attached SiO$_2$ was 0.4 part by weight relative to 100 parts by weight of the phosphor, and the amount of attached ZnO was 0.18% by weight. A phosphor slurry was prepared by a usual method by using the phosphor obtained as described above and an ordinary ammonium bichromate-containing polyvinyl alcohol aqueous solution. A coating test was conducted using the phosphor slurry thus obtained, and the light sensitivity, the adhesion to the panel, the water wettability and the fogging of the glass surface were examined. The results are shown in Table 1. As a Comparative Example, a similar test was conducted with respect to a ZnS:Cu,Au,Al phosphor having 0.18% by weight of Zn(OH)$_2$ attached instead of ZnO.

The fogging of the glass surface is meant for color mixing caused by dots or stripes of the above-mentioned green phosphor remaining at the position of dots or

TABLE 2

| Phosphor (Y$_2$O$_2$S:Eu phosphor) | Amount of ZnO attached (or deposited) | Screening properties | | | | Powder properties | | |
|---|---|---|---|---|---|---|---|---|
| | | Adhesion angle | Stripe width (maximum) | Stripe width (minimum) | Cross contamination Red output/ blue output | Sedimentation volume in water (cc/g) | Water wettability | Hardness of dried cake |
| ZnO attached | 0.3 wt % | 260° | 220 μm | 130 μm | 0.68 | 0.48 (Supernatant: transparent) | 14.6 wt % | Soft |
| Zn(OH)$_2$ attached | 0.3 wt % | 200° | 220 μm | 155 μm | 1 | 0.56 (Supernatant: transparent) | 16.0 wt % | Hard |
| ZnO deposited | 0.3 wt % | 200° | 200 μm | 140 μm | 1.35 | 0.52 (Supernatant: turbid) | 16.4 wt % | Soft |

As is evident from the above results, it has been confirmed that the phosphor of this Example is excellent in each of the light sensitivity, the adhesiveness and the dispersibility and is less susceptible to color mixing.

stripes of a light emitting phosphor component formed subsequently. In this test, as described above (see Example 1), a part of a face plate having stripes formed thereon, is enlarged (100 times by a magnifying projection microscope and projected on a screen, whereupon the number of phosphor particles remaining in the non-exposed portion, i.e. in the space portion between stripes, in 20 mm × 20 mm on the screen (0.2 mm × 0.2 mm on the face plate).

TABLE 3

| Phosphor (ZnS:Cu, Au, Al phosphor) | Amount of ZnO attached | Amount of SiO$_2$ deposited | Screening properties | | | | Powder properties |
| --- | --- | --- | --- | --- | --- | --- | --- |
| | | | Adhesion angle | Stripe width (maximum) | Stripe width (minimum) | Fogging of glass surface | Water wettability |
| ZnO, SiO$_2$ coated | 0.18 wt % | 0.40 wt % | 200° | 230 μm | 130 μm | 5 particles/ 0.2 mm × 0.2 mm | 15.0 wt % |
| Zn(OH)$_2$, SiO$_2$ coated | 0.18 wt % | 0.40 wt % | 150° | 200 μm | 145 μm | 15 particles/ 0.2 mm × 0.2 mm | 17.5 wt % |

As is evident from above results, with the phosphor of this Example, better results were obtained in the respective tested items as compared with the phosphor coated with Zn(OH)$_2$ and SiO$_2$.

As described in detail in the foregoing, according to the phosphor of the present invention and the method for treating the surface thereof, it is possible to accomplish the prevention of color mixing of the phosphor screen and the improvement of the adhesive strength simultaneously by attaching to the phosphor surface zinc oxide formed in a suspension of the phosphor. Further, the dispersibility of the phosphor can be maintained in good condition even when the attached amount is increased.

We claim:

1. A method for treating the surface of a phosphor for use in a color television picture tube, which comprises maintaining a phosphor suspension containing said phosphor and zinc ions at an elevated temperature and adding an alkaline solution to the suspension to adjust the pH to a level sufficient to form zinc oxide colloidal substance in said suspension and attach the so formed colloidal zinc oxide on the surface of the phosphor, the combination of pH and temperature conditions during the formation and attachment of the colloidal zinc oxide to the phosphor being within the hatched line portion of FIG. 5 of the drawings.

2. The method for treating the surface of a phosphor according to claim 1, wherein the phosphor suspension containing the phosphor and zinc ions comprises an aqueous solution containing at least one water-soluble zinc compound selected from the group consisting of zinc sulfate, zinc acetate, zinc nitrate and zinc halide, ZnX$_2$, wherein X is a halogen other than fluorine, and said phosphor dispersed in this aqueous solution.

3. The method for treating the surface of a phosphor according to claim 1, wherein said alkaline solution is an aqueous solution of at least one compound selected from the group consisting of sodium hydroxide, potassium hydroxide and ammonium hydroxide.

* * * * *